United States Patent [19]
Watanabe

[11] Patent Number: 5,621,907
[45] Date of Patent: Apr. 15, 1997

[54] MICROPROCESSOR WITH MEMORY STORING INSTRUCTIONS FOR TIME-COMPRESSED FETCHING OF INSTRUCTION DATA FOR A SECOND CYCLE WITHIN A FIRST MACHINE CYCLE

[75] Inventor: Nobuhisa Watanabe, Kanagawa-ken, Japan

[73] Assignee: Sony Corporation, Japan

[21] Appl. No.: 382,392

[22] Filed: Feb. 1, 1995

Related U.S. Application Data

[62] Division of Ser. No. 82,822, Jun. 28, 1993, which is a continuation of Ser. No. 810,532, Dec. 19, 1991, abandoned, which is a continuation of Ser. No. 465,613, Jan. 19, 1990, abandoned, which is a continuation of Ser. No. 368,942, Jun. 13, 1989, abandoned, which is a continuation of Ser. No. 251,039, Sep. 23, 1988, abandoned, which is a continuation of Ser. No. 810,357, Dec. 18, 1995, abandoned.

[30] Foreign Application Priority Data

Dec. 29, 1984 [JP] Japan ................................. 59-276835

[51] Int. Cl.⁶ .............................. G06F 9/30; G06F 9/38
[52] U.S. Cl. ............................................................ 395/383
[58] Field of Search ............................................... 395/375

[56] References Cited

U.S. PATENT DOCUMENTS 4,462,073  7/1984  Grondalski .............................. 395/375
4,654,781  3/1987  Schwartz et al. ................... 395/421.09

OTHER PUBLICATIONS

Mano, M. Morris; "Computer System Architecture" pp. 244–245, 264–279 290–323; 1982.

Primary Examiner—Krisna Lim
Attorney, Agent, or Firm—Ronald P. Kananen

[57] ABSTRACT

A microcomputer includes an instruction decoder and a program counter. The instruction decoder decodes fetched instructions and outputs a control signal ordering execution of the fetched instruction. The control signal from the instruction decoder includes a component controlling fetch cycles which triggers a fetch cycle at the beginning of each instruction cycle to fetch the operand for the instruction currently being executed and midway through each instruction cycle to fetch the OP code for the next instruction. The program counter is responsive to the triggering of each fetch cycle to increment its counter value so as to keep the counter value consistent with the address being accessed in each fetch cycle.

4 Claims, 4 Drawing Sheets

MICROPROCESSOR WITH MEMORY STORING INSTRUCTIONS FOR TIME-COMPRESSED FETCHING OF INSTRUCTION DATA FOR A SECOND CYCLE WITHIN A FIRST MACHINE CYCLE

This application is a division of application Ser. No. 08/082,822, filed on Jun. 28, 1993, which is a continuation of Ser. No. 07/810,532, filed Dec. 19, 1991, now abandoned which was a continuation of Ser. No. 07/465,613, filed Jan. 19, 1990, now abandoned which was a continuation of Ser. No. 07/368,942, filed Jun. 13, 1989, now abandoned, which was a continuation of Ser. No. 07/251,039, filed Sep. 23, 1988, now abandoned, which was a continuation of Ser. No. 06/810,357, filed Dec. 18, 1985, now abandoned.

BACKGROUND OF THE INVENTION

The present invention relates generally to a microcomputer. More specifically, the invention relates to improved instruction cycling in a microcomputer for speeding up microcomputer processing.

Modern monolithic microcomputers often employ a pipe-line architecture which allows fetch cycles and instruction execution cycles to overlap, in other words, each such fetch cycle for fetching any part of an instruction from memory does not overlap with the execution of that same instruction, such execution occuring in a following cycle. Each fetched instruction consists of an operation code (OP code) which is stored in a read-only-memory (ROM), such as a programmable read-only-memory (PROM), and an operand, also stored in the ROM, which may point to a variable value stored in a random-access memory (RAM). In conventional pipe-line architectures, the OP code fetch and the operand fetch are performed in the execution cycles for different instructions, each of which is hereafter referred to generally as an "instruction cycle" or more specifically as one or more "machine cycles". For example, in order to fetch a 2-byte instruction including a 1-byte OP code and a 1-byte operand in a 4-bit microcomputer (in the case of four bits per byte), 2 instruction cycles are required. The same applies to an 8-bit machine with eight bits per byte, as discussed below. Therefore, in this case, the performance of each instruction requires three machine cycles or, in the more general and less precise terminology above, three instruction cycles.

As is clear, the execution of each instruction includes the fetching of the OP code then of each operand in sequence, and then the execution itself. Generally, a series of machine cycles are involved with the fetching of the operand part of the instruction and the execution of the instruction, in which the fetching of the OP code byte overlaps with the execution of the preceding instruction in the conventional pipeline processor. This conventional pipe-line architecture is not satisfactorily efficient.

SUMMARY OF THE INVENTION

In general, the fetch cycle for fetching OP codes or operands is shorter than the instruction cycle. This means that there is a period in the execution cycle during which no fetching is being performed. If the next instruction component can be fetched during this period, run-time can be shortened.

Therefore, it is an object of the present invention to provide a microcomputer with an improved fetch cycle for decreasing the number of machine cycles (instruction cycles) required to perform an instruction of plural sequential bytes, including the fetching of the first OP code byte and each further byte for an operand or data.

In order to accomplish the aforementioned and other objects, a microcomputer, according to the present invention, includes an instruction decoder and a program counter. The instruction decoder decodes fetched instructions and outputs a control signal ordering execution of the fetched instruction. The control signal from the instruction decoder includes a component controlling fetch cycles which triggers a fetch cycle at the beginning of each instruction cycle to fetch the operand for the instruction to be executed and midway through each instruction (machine) cycle to fetch the OP code of the next instruction, that is, for the case of a 1-operand instruction.

The program counter is responsive to the triggering of each fetch cycle to increment its counter value so as to keep the counter value consistent with the address being accessed in each fetch cycle.

According to one aspect of the invention, a method of operating a microprocessor with a pipe-line architecture, which allows the instruction data for a later instruction execution cycle to be fetched from memory during a current instruction cycle, comprises the steps of:

preprogramming instruction operation codes (OP codes) for instructions requiring more than one byte of instruction data with additional information requesting time-compressed fetching of instruction data; and fetching one or two bytes of instruction data from memory in a time-compressed fashion during the instruction cycle immediately following the fetching of each instruction which includes the request for the time-compressed fetch.

For instructions with one operand byte, the instruction data consists of one OP code byte and one operand byte, and the OP code byte is fetched immediately before the onset of an instruction cycle, the fetching step comprising the step of fetching the operand byte associated with the fetched OP code byte concurrently with the onset of the instruction cycle. For the alternative of the instruction data consisting of one OP code byte and two operand bytes, for which the OP code byte is also fetched immediately before the onset of a first instruction, the fetching step comprises the steps of fetching the first operand byte associated with the fetched OP code byte concurrently with the onset of the first instruction cycle and of fetching the second operand byte associated with the first operand byte during the first instruction cycle following fetching of the first operand byte.

The method further comprises the step of executing the instruction specified by the OP code and operand bytes in the instruction cycle immediately after the one in which the OP code byte was fetched, that is, for the case of the 1-operand instruction. More precisely, for the case of the 1-operand instruction, the OP code was fetched at the very end of the preceding cycle from the cycle in which the execution takes place, as a result of the program counter being incremented earlier in that preceding cycle.

BRIEF DESCRIPTION OF THE DRAWINGS

The present invention will be understood more fully from the detailed description given herebelow and from the accompanying drawings of the preferred embodiments of the invention, which, however, should not be taken to limit the invention to the specific embodiments but are for explanation and understanding only.

In the drawings.

DESCRIPTION OF THE PREFERRED EMBODIMENT

Figure 1:
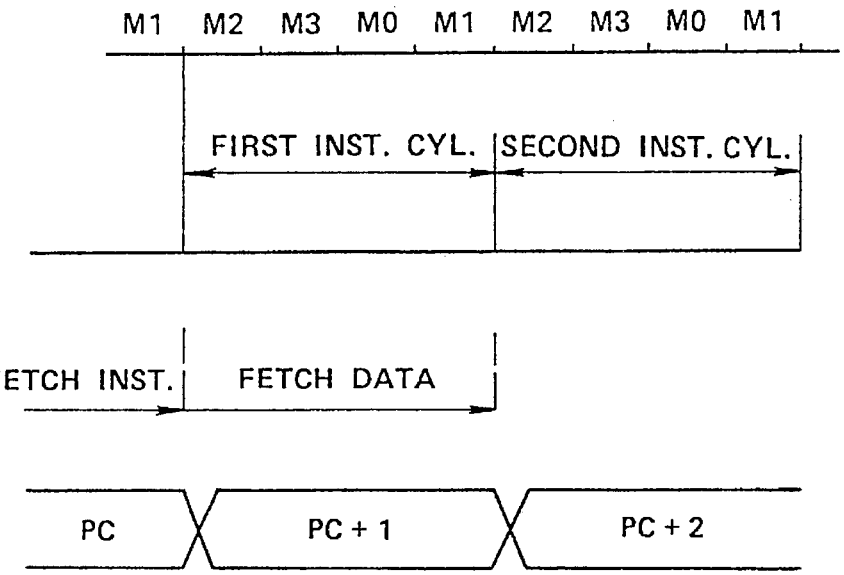
FIGS. 1(A) and 1(B) are timing charts for instruction cycles for execution of 2-byte instructions according to the prior art and the present invention, respectively.
Figure 1:
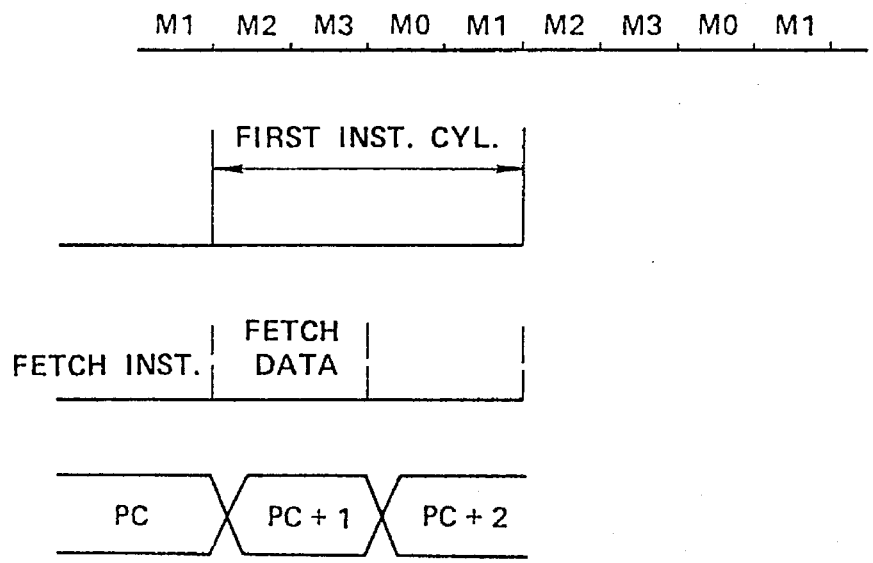

Referring now to the drawings, particularly FIGS. 1(A) and 1(B), the general and fundamental idea of a first aspect of the preferred process of the present invention will be described in contrast with a conventional process. FIG. 1(A) illustrates a typical process in the prior art and FIG. 1(B) shows the preferred process according to the present invention. Both of the charts are directed to execution of a 2-byte instruction which includes an 8-bit operation code (OP code), such as a code LDA to load an accumulator (such as the data buffer 2 of FIG. 3), and an 8-bit operand which, in this example, may be taken to be an address code identifying a RAM address to be accessed. Namely, in this example, the instruction orders the contents of a specific RAM address to be transferred or loaded into the accumulator.

In the conventional process of FIG. 1(A), the OP code LDA for the illustrated, i.e., so-labelled, second instruction (machine) cycle is fetched before starting the first instruction cycle (machine cycle; this further specifying is not continued in the following, the general term being left to stand alone). In the next fetch cycle, which is coincident with the onset of the illustrated first instruction cycle (i.e., so-labelled in the drawing), data in the RAM address identified by the operand is fetched. The data fetched in the fetch cycle starting concurrently with the illustrated first instruction cycle and the OP code LDA fetched before the illustrated first instruction cycle are used in the illustrated (this further specifying is also not generally continued in the following) second instruction cycle.

In the conventional process set forth above, a program counter is incremented by one at the end of each instruction cycle. Therefore, at the start of the fetch cycle of the OP code, the program counter value is PC. At the start of the illustrated first instruction cycle, the program counter is incremented by 1 and thus the counter value becomes PC+1. Similarly, the program counter is incremented by 1 at the start of the illustrated second is instruction cycle, and thus the counter value becomes PC+2 for the subsequent fetching of the OP code of the next instruction at the end of the illustrated second instruction cycle, while execution of the current instruction is completed in the illustrated second instruction cycle.

In the inventive process of FIG. 1(B), the OP code for the first instruction cycle is fetched before the start of the illustrated first instruction cycle, as in the above process. This 1-byte OP code of the 2-byte instruction, however, includes a request to compress the fetch cycle. In the period $M_2$–$M_3$ during the first instruction cycle, data in the RAM address identified by the operand is fetched. The operand data fetched in the period $M_2$–$M_3$ in the first instruction cycle and the OP code fetched before the first instruction cycle are used to execute the first instruction cycle. In this inventive process, the instruction represented by each such OP code is such that the data in the RAM address, which was fetched in the period $M_2$–$M_3$, is not needed for execution of the instruction until the later part of the first instruction cycle, namely in the period $M_0$–$M_1$ of that cycle.

During the process set forth above, the program counter is incremented by one at the end of each instruction cycle. The program counter is also incremented by 1 in response to the $M_3$ clock pulse in the illustrated first instruction cycle. In other words, at the end of the fetch cycle for the OP code, the program counter value is incremented from PC to PC+1. In response to the $M_3$ clock in the first instruction cycle (actually its falling or trailing edge, as indicated further above and below), the program counter is incremented by 1 and thus the counter value changes from PC+1 to PC+2. Thereafter, the program counter is again incremented by 1 in response to the $M_1$ clock pulse at the end of the first instruction cycle.

During the period $M_0$–$M_1$ in the first instruction cycle, the OP code for the next instruction cycle can be fetched. Therefore, as will be appreciated herefrom, only one instruction cycle is needed to execute a 2-byte instruction in the preferred process according to the present invention.

Figure 2A:
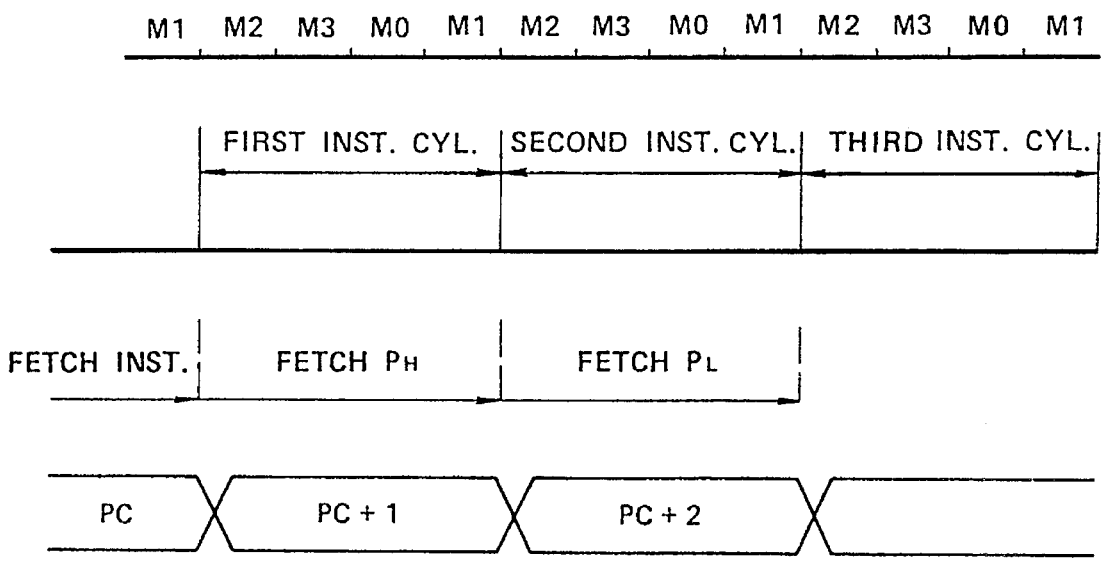
FIGS. 2(A) and 2(B) are timing charts for instruction cycles for execution of 3-byte instructions according to the prior art and the present invention, respectively.
Figure 2B:
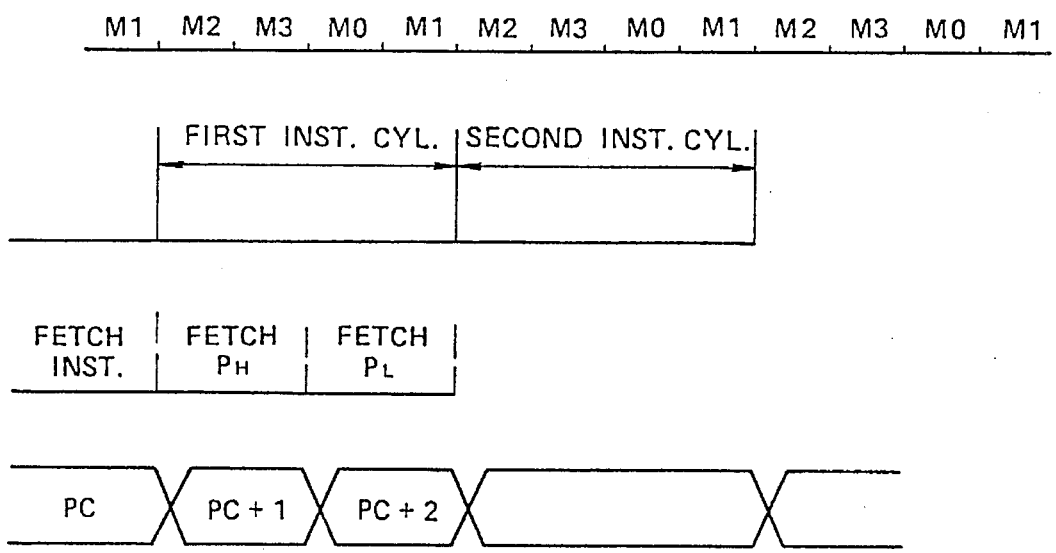

FIGS. 2(A) and 2(B) show another aspect of the preferred embodiment, this example concerning execution of a 3-byte instruction, namely an OP code with two operands. The example is directed to a subroutine call by which program control jumps to a program address specified by two bytes, i.e. a HIGH address byte $P_H$ and a LOW address byte $P_L$. The instruction thus includes a 1-byte (8-bit) OP code CALL and the two operand bytes $P_H$ and $P_L$.

In the conventional process of FIG. 2(A), the OP code for the instruction to be executed in the illustrated third instruction cycle (so-labelled in the drawing) is fetched before the start of the first instruction cycle. In the next fetch cycle, which begins concurrently with the first instruction cycle, the HIGH address byte $P_H$ is fetched. Similarly, in the second instruction cycle, the LOW address byte $P_L$ is fetched. The HIGH and LOW address bytes $P_H$ and $P_L$ fetched in the fetch cycles concurrent with the first and second instruction cycles and the OP code CALL fetched before the first instruction cycle are used to execute the subroutine call instruction in the third instruction cycle.

During the process set forth above, the program counter is incremented by one at the end of each instruction cycle. Accordingly, at the end of the fetch cycle for the OP code, the program counter value is incremented from PC to PC+1. At the end of the first instruction cycle, the program conter is incremented by 1 and thus the counter value increases from PC+1 to PC+2. Similarly, the program counter is incremented by 1 at the end of the second and third instruction cycles.

In the inventive process of FIG. 2(B), the OP code CALL for the instruction to be executed in the second instruction cycle is fetched before the start of the illustrated (again, so-labelled) first instruction cycle. The OP code CALL includes a request to compress the succeeding fetch cycles. During the period $M_2$–$M_3$ in the first instruction cycle, the HIGH address byte $P_H$ is fetched. During the period $M_0$ to $M_1$ in the first instruction cycle, the LOW address byte $P_L$ is fetched. The address bytes $P_H$ and $P_L$ fetched in the first instruction cycle and the OP code CALL fetched before the first instruction cycle are used to execute the subroutine call in the second instruction cycle.

During the process set forth above, the program counter is incremented by one at the end of each instruction cycle. Also, the program counter is incremented by 1 in response to the $M_3$ clock pulse, which falls halfway through each instruction cycle. At the end of the fetch cycle for the OP code, the program counter value increases from PC to PC+1. In response to the $M_3$ clock in the first instruction cycle, the program counter is again incremented by 1 and thus the counter value becomes PC+2. Thereafter, the program counter is incremented by 1 in response to the $M_1$ clock pulse at the end of the first instruction cycle, and so on.

At the start of the second instruction cycle, the counter 4 is incremented so that the OP code for the next instruction to be executed can be fetched.

Therefore, as will be appreciated herefrom, only two instruction cycles are needed to execute a 3-byte instruction in the preferred process according to the present invention.

Figure 3:
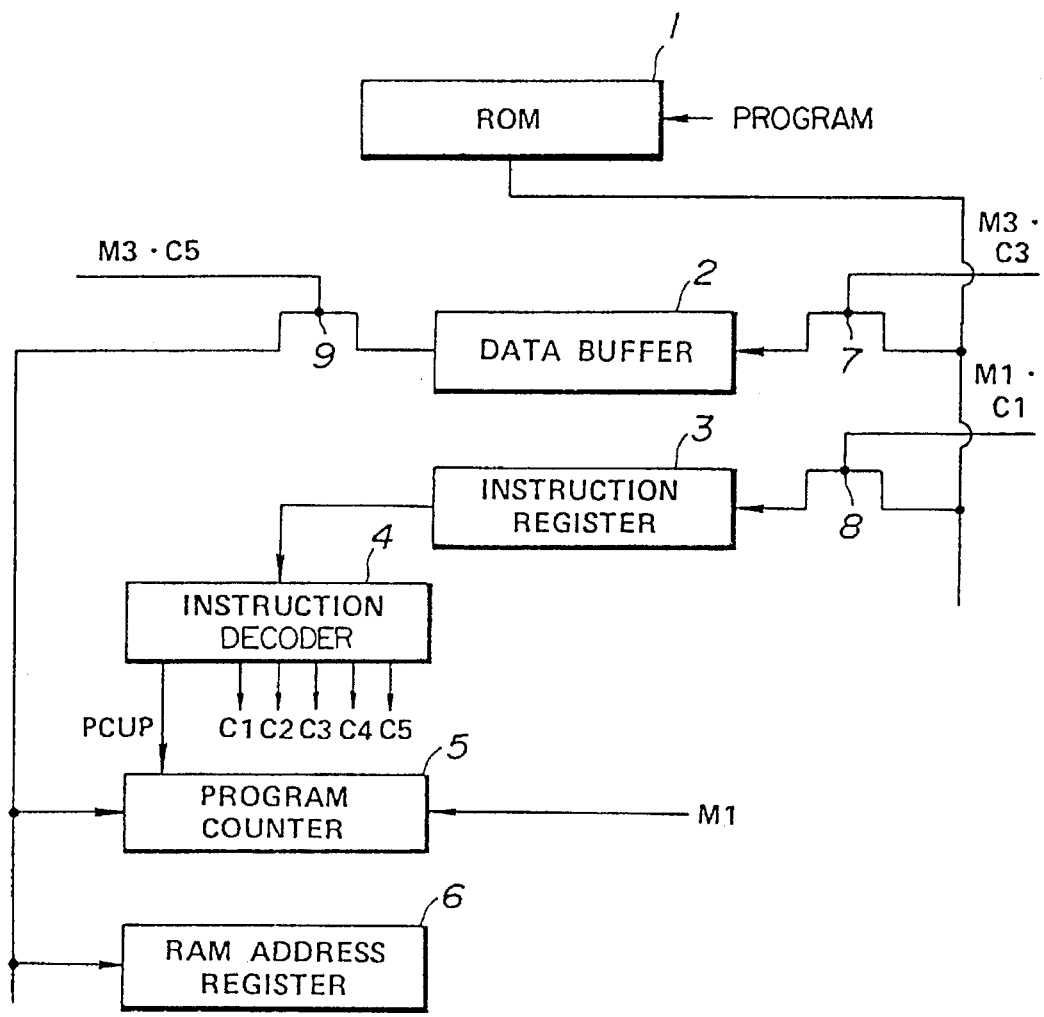
FIG. 3 is a schematic block diagram of a microcomputer system according to the present invention.

FIG. 3 shows a microprocessor system designed to perform the preferred process according to the present invention. The preferred embodiment of a microcomputer comprises a programmable ROM (PROM) 1, a data buffer 2, an instruction register 3, an instruction decoder 4 which may be based on a programable logic array (PLA), for example, a program counter 5, a RAM address register 6, and field-effect transistors (FET) 7 to 9.

Figure 4:
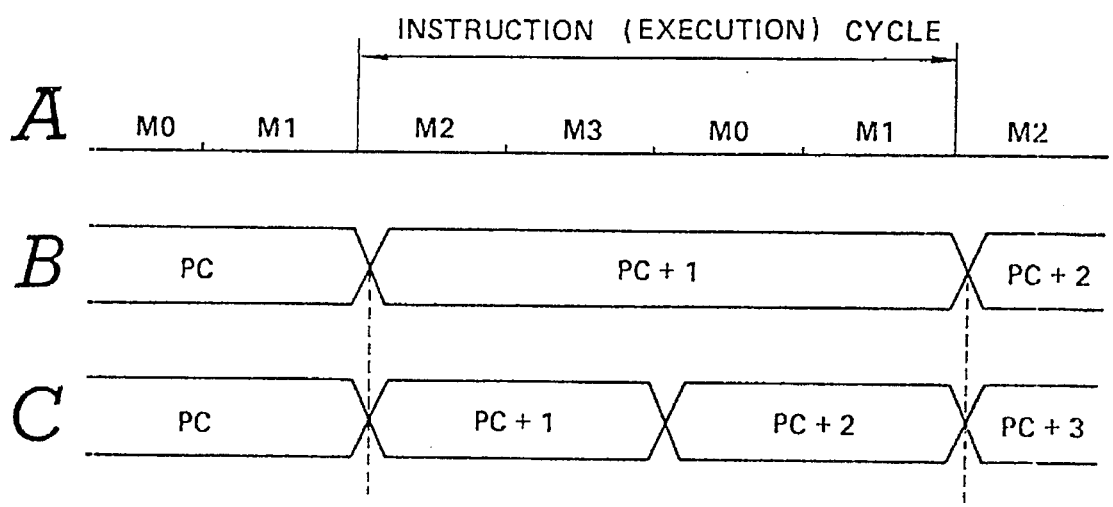
FIG. 4 compares timing charts for conventional and preferred procedures of the present invention for executing instructions, in which (B) shows the program counter value during execution of 1-byte instructions and (C) shows the same for 2-byte instructions.

Operation of the preferred embodiment of the microcomputer composed as set forth above will be described hereblow with reference to FIG. 4. In FIG. 4, (A) shows clock pulses $M_2$, $M_3$, $M_0$ and $M_1$ produced during each instruction (again, machine) cycle. (B) shows the program conter value in the program counter 5 during execution of sequential 1-byte intructions. (C) shows variation of the counter value in the program counter 5 during execution of sequential 2-byte instructions.

The instruction decoder outputs a program counter increment signal PCUP and several control signals $C_1$–$C_5$, the latter of which controls the flow of information among the microprocessor elements 1–6. The control signals $C_3$, $C_1$ and $C_5$ are ANDed with the clock pulses $M_3$, $M_1$ and $M_3$ for respective control of the FETs 7, 8 and 9. FETs 7 and 8 allow data, either operands or OP codes, from the program ROM 1 to be latched by the data buffer 2 or the instruction register 3 when conductive. The FET 9 allows the operand in the data buffer 2 onto the data bus when conductive, whereby the operand can be loaded into the RAM address register 6 for loads, stores or similar commands or into the program counter 5 for subroutine calls, and so forth.

When an OP code includes a request for a time-compressed operand fetch, the instruction decoder 4 outputs both a PCUP pulse and $C_3$ and $C_5$ pulses. The latter two pulses allow the operand to be loaded into and out of the data buffer 2 in response to the next $M_3$-clock pulse, and the PCUP pulse increments the program counter to point to the next OP code.

In the example shown in FIG. 4(B), a 1-byte instruction is executed in a single instruction cycle. Fetching of the first byte of each instruction from the ROM 1 is triggered by the trailing edge of the $M_1$ clock pulse in the presence of the $C_1$ output from the instruction decoder 4. At the same time, the program counter 5 is incremented by 1 in response to the PCUP signal at the trailing edge of the $M_1$-clock pulse. The fetched instruction (OP code) is read into the instruction register 3 and then fed to the instruction decoder 4. The instruction decoder 4 decodes the fetched instruction and outputs appropriate signals $C_1$ to $C_5$.

The trailing edge of the $M_1$ clock signals the start of the instruction cycle in which the instruction fetched in the preceding instruction cycle is executed. Concurrent with execution of the instruction fetched in the preceding cycle, the first bite of the next instruction is fetched during the current instruction cycle. The ROM address to be accessed for each instruction byte is represented by the counter value (PC, PC+1, PC+2) which is incremented by 1 at every trailing edge of the $M_1$ clock and by the PCUP signal.

During execution of 1-byte instructions, since there are no requests for a compressed operand fetch, the $C_3$ and $C_5$ outputs of the instruction decoder 4 remain inactive. As a result, the FETs 8 and 9 remain non-conductive. Also, at this time, since the PCUP signal of the instruction decoder 4 is not produced midway through the instruction cycle, the program counter 5 is incremented only in response to the trailing edge of the $M_1$ clock.

As shown in FIG. 4(C), when a 2-byte instruction including a 1-byte OP code and a 1-byte operand is to be executed, the $C_3$ and $C_5$ pulses are output by the instruction decoder 4 after fetching the OP code of the instruction following the trailing edge of the $M_1$ clock. The $C_3$ and $C_5$ outputs render the FETs 7 and 9 conductive to load the operand out of ROM 1 and into the data buffer 2, the program counter 5 and/or the RAM address register 6.

At the trailing edge of the $M_3$ clock, the program counter 5 is incremented by 1 in response to the PCUP signal from the instruction decoder 4. At the same time, for example, the operand address data in the RAM address register 6 is read out and used in the execution of the instruction in the period $M_0$–$M_1$.

During the period $M_0$–$M_1$, the first byte of the next instruction is fetched from the ROM. In this case, since the program counter 5 is incremented by PCUP in response to the trailing edge of the $M_3$ clock, the ROM address represented by the counter value will correspond to the address of the OP code for the next instruction.

It will be appreciated that, in order to enable compression of a fetch cycle according to the preferred procedure as set forth above, it is necessary that the second and/or third bytes of data do not contain OP code components but rather contain only operands such as data addresses. Since in most 4-bit microcomputers, instructions contain only a 1-byte OP code and one or more operand bytes, the preferred procedure as set forth above is applicable to most microcomputers.

Figure 5A:
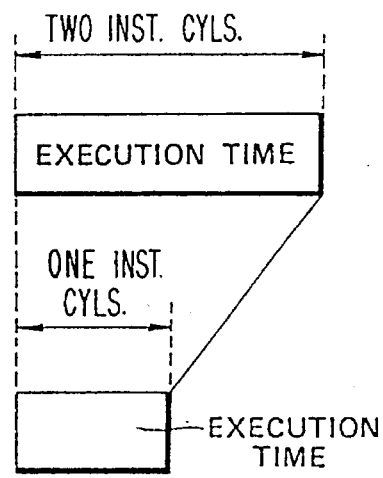
FIGS. 5(A) and 5(B) illustrate the durations of instruction cycles for execution of 2-byte and 3-byte instructions, each figure comparing the conventional process (top) and the process of the present invention (bottom)
Figure 5B:
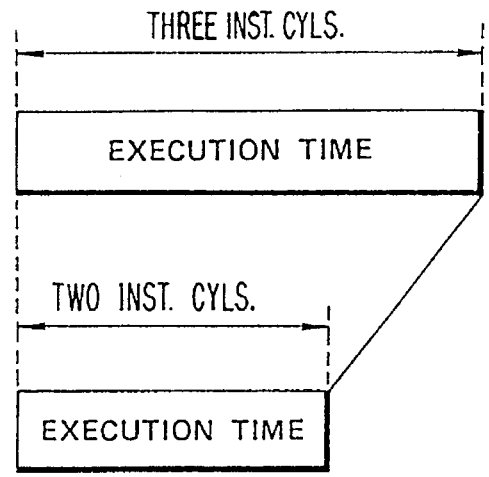

As compared in FIG. 5(A), according to the preferred process of the invention as in FIG. 1(B), 2-byte instructions which conventionally required two instruction cycles (i.e., machine cycles, as above) for execution (top) can be executed in a single instruction cycle in a pipe-line architecture (bottom) according to the present invention. Similarly, as compared in FIG. 5(B), 3-byte instructions which conventionally required three intruction (machine) cycles for execution (top) can be executed in two instruction cycles (bottom), as in the embodiment of FIG. 2(B). Therefore, as easily understood herefrom, the preferred process according to the invention effectively shortens execution time.

Figure 6A:
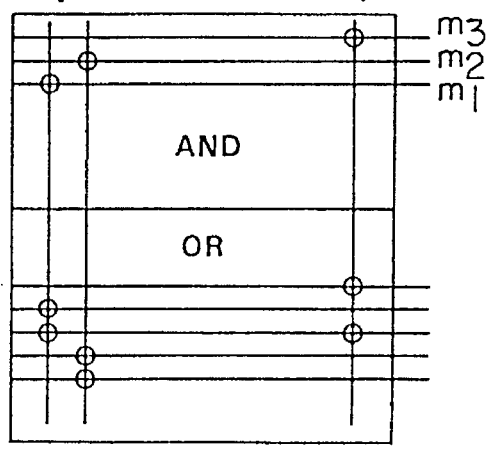
FIGS. 6(A) and 6(B) are illustrations of instruction decoders according to the prior art and the present invention, respectively.
Figure 6B:
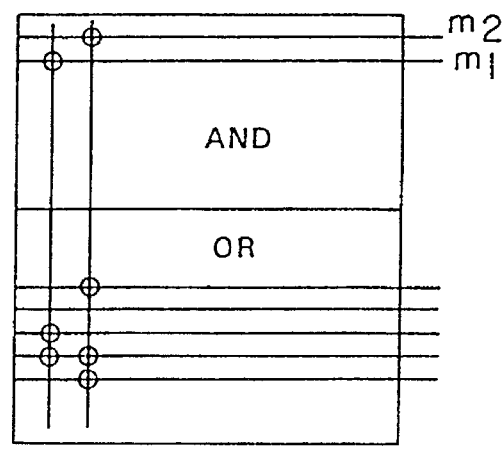

In addition, FIGS. 6(A) and 6(B) diagrammatically illustrate the area required for the instruction decoder in the prior art system and the system according to the invention, wherein (A) shows a conventional system and (B) shows that according to the present invention. In FIGS. 6(A) and 6(B), the top horizontal lines represent AND-element selector lines and the vertical lines represent OR-element selector lines. The line $m_1$ represents machine state 1 selector input for a signal corresponding to a first machine cycle, $m_2$ represents machine state 2 selector input for a second machine cycle signal, and $m_3$ represents machine state 3 selector input for a third machine cycle signal.

As will be apreciated from FIG. 6(A), in the conventional system, three machine states (cycles) are required to execute a 3-byte instruction requiring three instruction (machine) cycles (top). However, according to the preferred process of the present invention, in order to execute 3-byte instructions, only two instruction (machine) cycles are required. Consequently, only two machine states (cycles) of the instruction decoder are required to execute 3-byte instructions (bottom). Therefore, the OR-element selector line which serves as control for the signal line for machine state (cycle) 3 becomes unnecessary. This results in a significant reduction in the total length of the element selector lines and thus allows a similar reduction of the size of the instruction decoder.

Therefore, the present invention fulfills all of the objects and advantages sought therefor.

While the specific arrangement of the preferred embodiment of the microprocessor has been disclosed hereabove in rder to facilitate full understanding of the invention, it would be obvious therefrom to a skilled worker in the art to provide a modified embodiment depending upon desired operations. Therefore, as will be appreciated that the invention should not be limited to the specific embodiment, but is instead intended to include all the possible embodiments and modifications of the embodiments which can be provided without departing from the principle of the invention as set out in the appended claims.

What is claimed is:

1. A pipeline processor comprising:
   (a) a memory for storing instructions, one of said instructions at least including a first byte and a second byte, each of said bytes of each said instruction being stored at respective addresses in said memory;
   (b) a counter for outputting sequentially a respective one of said addresses of said memory for reading out said instruction bytes, said counter having a first and second input, said first input receiving a predetermined sequence of clock pulses defining a machine cycle;
   (c) a decoder for receiving said first byte of each said instruction read out from said memory and for outputting corresponding control signals, said control signals being supplied to the second input of said counter when said first byte in said decoder indicates the instruction has a plurality of bytes;
   wherein said counter is incremented one count value in response to said control signal; and
   wherein a time-compressed fetching of the next byte of instruction following its first byte occurs within one machine cycle in a way that instruction data for a later, second instruction execution cycle is fetched from said memory during a current, first instruction cycle.

2. A pipeline processor as set forth in claim 1 wherein said instructions stored in said memory further include instruction data for a later instruction execution cycle to be fetched from said memory during a current instruction cycle.

3. A pipeline processor as set forth in claim 1 wherein said instructions stored in said memory include instruction operation codes (OP codes) for instructions requiring more than one byte of instruction data with additional information requesting time-compressed fetching of instruction data.

4. A microcomputer comprising:
   a read-only-memory storing instruction including an instruction code component and an instruction data component, said instruction code component including instructions for compressing said instruction data component;
   an instruction decoder decoding fetched instructions and outputting control signals ordering execution of the fetched instructions, said control signal including a component controlling a fetch cycle which triggers a fetch cycle at the beginning of each instruction cycle to fetch the instruction data for the instruction currently being executed and to fetch said instruction code during one instruction cycle for a next instruction cycle, said instruction decoder being responsive to said instruction for compressing instruction data for performing compressed-fetching of instruction data; and
   a program counter to be incremented upon every occurrence of triggering the fetch cycle.

* * * * *